June 12, 1928.

M. A. GOETZ

FLOW METER

Filed May 26, 1926

1,673,674

Inventor:
Milton A. Goetz,
by Alexander S. _____
His Attorney.

Patented June 12, 1928.

1,673,674

UNITED STATES PATENT OFFICE.

MILTON A. GOETZ, OF BROOKLYN, NEW YORK, ASSIGNOR, BY MESNE ASSIGNMENTS, TO BAILEY METER COMPANY, A CORPORATION OF DELAWARE.

FLOW METER.

Application filed May 26, 1926. Serial No. 111,865.

In connection with the measurement of the flow of fluids through conduits the condition is met with sometimes wherein the flow is in one direction at one time and in the other direction at other times. To meet such conditions, it is necessary to provide a flow meter installation capable of measuring flow in both directions and the object of my present invention is to provide an improved construction and arrangement for accomplishing this result.

Figure 1:
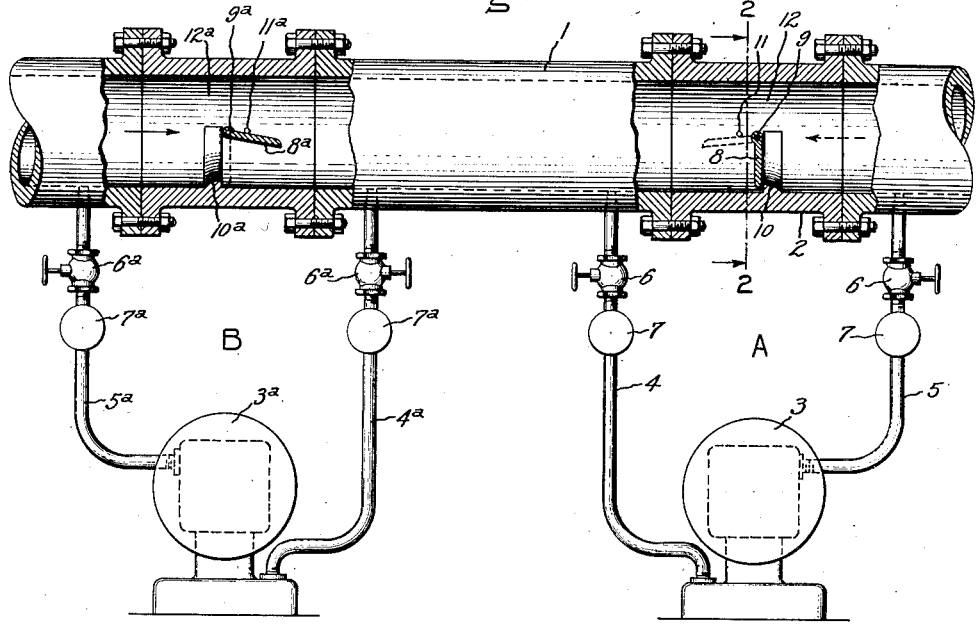
Figure 2:
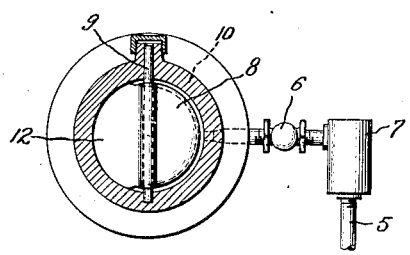

In the drawing, Fig. 1 is a plan view partly in section of a flow meter installation embodying my invention, the metering instruments being shown diagramamtically in elevation, and Fig. 2 is a sectional view taken on line 2—2, Fig. 1.

According to my invention, I provide in connection with the conduit through which flows the fluid to be metered two complete flow meters each comprising a pressure difference creating device and a measuring instrument and I so construct and arrange the pressure difference creating devices that each is operative for creating a pressure difference with flow only in one direction and is inoperative when the flow is in the other direction, the arrangement being such that the changing of a pressure difference creating device from operative to inoperative condition is effected by the reversal of the flow itself.

Referring to the drawings, 1 indicates a conduit through which a fluid to be metered flows and through which the flow may be in either direction. Associated with the conduit are two flow meters A and B, the flow meter A being effective to measure flow in a direction from left to right as is indicated by the full line arrow and the flow meter B being effective to measure flow from right to left as is indicated by the dotted line arrow.

Flow meter A comprises a pressure difference creating device 2, and a measuring instrument 3 connected to device 2 by leading and trailing pressure pipes 4 and 5, such pipes being shown as having a usual arrangement of shut off valves 6 and pressure head equalizing reservoirs 7. The pressure difference creating device comprises a pipe section in which is pivoted an orifice plate 8. Plate 8 may be pivotally mounted in the pipe section in any suitable manner. In the present instance, it is shown as being carried by a spindle 9 journaled in the wall of the pipe section. In the pipe section is a semi-circular stop 10 which presents a straight surface on one side for engagement with the edge of plate 8 and a rounded surface on the other side. Also, in the pipe section is a suitable stop 11 which may be in the form of a pin. When the flow through conduit 1 is from left to right plate 8 stands in engagement with stop 10 as is shown in full lines, thus providing a pressure difference creating device in the form of an orifice 12. When the flow through conduit 1 is from right to left, plate 8 stands in engagement with stop 11 as is shown in dotted lines, and in this position is ineffective to produce a pressure difference, i. e., is inoperative. It is moved from one position to the other and is held in either of its positions by the flow of the fluid and in this connection it will be noted that stop 11 is located so that plate 8 does not move quite to central position. This forms a means whereby it is assured that when the flow is from left to right, plate 8 will be moved by the flow from the dotted line position to the full line position. Any other suitable means may be used for effecting this result.

The flow meter B is shown as being of the same construction as is flow meter A except that its orifice plate is oppositely arranged so that it is adapted to measure flow from right to left. The same reference characters with the exponent "a" added, have been applied to corresponding parts of flow meter B. Its operation will be understood from the explanation given already in connection with flow meter A.

With the above described arrangement, it will be seen that flow meter A functions to measure flow in one direction and that flow meter B functions to measure flow in the other direction, and that the operation is entirely automatic, the flow of the fluid itself serving to move the plates 8 and 8$^a$ from their operative positions to their inoperative positions. Also, it will be seen that when either plate is in its inoperative position, it does not obstruct the flow through the conduit to any appreciable extent.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A flow meter for measuring flow of fluid through a conduit, said flow meter comprising a pressure difference creating device and a measuring instrument, said pressure difference creating device comprising an orifice plate so mounted in the conduit that it will be moved therein automatically from an operative to an inoperative position upon reversal of the direction of flow of fluid through the conduit.

2. A flow meter for measuring flow of fluid through a conduit, said flow meter comprising a pressure difference creating device and a measuring instrument, said pressure difference creating device comprising an orifice plate so pivotally mounted in the conduit that it will be moved automatically from operative to inoperative position by the reversal of fluid flow through the conduit.

3. The combination with a conduit through which a fluid to be metered flows, of two flow meters associated therewith each comprising a pressure difference creating device and a measuring instrument, each pressure difference creating device comprising an orifice plate so pivotally mounted in the conduit that it will be moved automatically from an operative to an inoperative position by flow of fluid through the conduit, said orifice plates being oppositely arranged relatively to each other so that when one is in operative position the other is in inoperative position.

4. A pressure difference creating device comprising a conduit section, and a plate so movably mounted therein that it is moved automatically by reversal of the fluid flow from a position wherein it extends transversely of the section to a position wherein it extends longitudinally thereof.

5. A pressure difference creating device comprising a conduit section, and a plate pivotally mounted therein to swing from a transverse position to a longitudinally extending position in accordance with the direction of flow of fluid in the conduit section, and means to limit the movements of the plate.

6. A pressure difference creating device comprising a conduit section, and a semicircular plate pivotally mounted therein and movable from a position wherein it extends transversely of the conduit section to a position wherein it extends longitudinally of the conduit section in accordance with the direction of flow of fluid in the conduit section, and means to limit the movements of the plate.

7. A flow meter for measuring flow of fluid through a conduit, said flow meter comprising a pressure difference creating device and a measuring instrument, said pressure difference creating device comprising a part so mounted that it may be moved to a position wherein the pressure difference creating device is effective to create a pressure difference which bears a definite relation to the rate of flow and a position wherein it is ineffective, such part being moved from one position to the other automatically upon reversal of the direction of the flow of fluid through the conduit.

8. The combination with a conduit through which a fluid to be metered flows, of two flow meters associated therewith each comprising a pressure difference creating device and a measuring instrument, each pressure difference creating device comprising a part so mounted that it may be moved to a position wherein the pressure difference creating device is effective to create a pressure difference which bears a definite relation to the rate of flow and a position wherein it is not so effective, said parts being so arranged relatively to each other that when flow through the conduit is in one direction one such part is positioned to render its pressure difference creating device effective and the other such part is positioned to render its pressure difference creating device ineffective and when flow is in the other direction, the positions of such parts are reversed.

9. The combination with a conduit through which a fluid to be metered flows, of two flow meters associated therewith each comprising a pressure difference creating device and a measuring instrument, each pressure difference creating device comprising a plate capable of assuming two positions, one wherein it extends transversely of the conduit and the other wherein it extends longitudinally of the conduit, said plates being oppositely arranged relatively to each other, and being moved from one position to the other automatically upon change in the direction of the flow of fluid through the conduit.

In witness whereof, I have hereto set my hand this 24th day of May, 1926.

MILTON A. GOETZ.